(12) United States Patent
Tsuda et al.

(10) Patent No.: US 6,551,708 B2
(45) Date of Patent: *Apr. 22, 2003

(54) POWDER COATING COMPOSITION CONTAINING VINYLIDENE FLUORIDE COPOLYMER AND METHYL METHACRYLATE COPOLYMER

(75) Inventors: Nobuhiko Tsuda, Settsu (JP); Ryuzi Iwakiri, Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 59 days.

(21) Appl. No.: 09/091,267
(22) PCT Filed: Dec. 16, 1996
(86) PCT No.: PCT/JP96/03671
§ 371 (c)(1),
(2), (4) Date: Jun. 17, 1998
(87) PCT Pub. No.: WO97/22671
PCT Pub. Date: Jun. 26, 1997

(65) Prior Publication Data
US 2001/0003127 A1 Jun. 7, 2001

(30) Foreign Application Priority Data
Dec. 18, 1995 (JP) .............................. 7-329081

(51) Int. Cl.$^7$ .................. C09D 05/03; C08L 27/16; C08L 33/12
(52) U.S. Cl. .................. 428/402; 428/407; 525/199; 525/200; 525/309; 525/934
(58) Field of Search ................. 428/402, 407; 525/199, 200, 309, 934

(56) References Cited

U.S. PATENT DOCUMENTS

| | | | |
|---|---|---|---|
| 3,790,645 A | * | 2/1974 | Murayama et al. ......... 525/276 |
| 4,770,939 A | * | 9/1988 | Sietses et al. ............. 428/402 |
| 5,030,394 A | * | 7/1991 | Sietses et al. ............. 264/28 |
| 5,177,150 A | * | 1/1993 | Polek ....................... 525/199 |
| 5,229,460 A | * | 7/1993 | Yousuf et al. ............. 525/198 |
| 5,405,912 A | * | 4/1995 | Simkin ..................... 525/199 |
| 6,221,429 B1 | * | 4/2001 | Verwey et al. ............ 525/199 |
| 6,362,295 B2 | * | 3/2002 | Gaboury et al. ........... 427/189 |

FOREIGN PATENT DOCUMENTS

| | | |
|---|---|---|
| EP | 0 456 018 | 11/1991 |
| JP | 50-116582 | 9/1975 |
| JP | 4-227743 | 8/1992 |
| JP | 8-183925 | 7/1996 |
| WO | 9406837 | 3/1994 |

* cited by examiner

Primary Examiner—D. R. Wilson
(74) Attorney, Agent, or Firm—Armstrong, Westerman & Hattori, LLP

(57) ABSTRACT

To provide a powder coating composition being capable of forming a coating film which has good pigment dispersibility, is excellent in weather resistance, film forming ability, appearance and stain-proofing property and, when used for PCM, is difficult to cause cracks because of its particularly excellent bending resistance at the time of bending of a metal plate. The powder coating composition comprises a powder which contains 100 parts by weight of a vinylidene fluoride copolymer having a melting point of not higher than 150° C., a crystallinity of not higher than 35% and a weight average molecular weight (Mw) of $1\times10^4$ to $5\times10^5$ and 10 to 400 parts by weight of a methyl methacrylate copolymer having a glass transition temperature of not higher than 110° C. and a weight average molecular weight of $1\times10^4$ to $5\times10^5$; an average particle size of particles constituting the powder being from 1 to 100 μm and an apparent density of the powder being from 0.2 to 1 g/ml.

7 Claims, No Drawings

POWDER COATING COMPOSITION CONTAINING VINYLIDENE FLUORIDE COPOLYMER AND METHYL METHACRYLATE COPOLYMER

TECHNICAL FIELD

The present invention relates to a powder coating composition. Further in detail, the powder coating composition of the present invention is suitable for coating of a precoat metal (hereinafter referred to as "PCM").

BACKGROUND ART

Hitherto, there have been many proposals as to a powder coating composition. In JP-A-1-103670, for example, there is described a thermosetting powder coating composition comprising a fluorine-containing copolymer containing chlorotrifluoloethylene as the main component and a curing agent.

A coating film obtained from the powder coating composition described in the above-mentioned publication has high gloss and good weather resistance. There is a problem, however, that the coating film is inferior in bending resistance because the fluorine-containing copolymer is crosslinked by the curing agent, and thus the coating film is difficult to be employed for an application such as PCM which need to be subjected to post processing such as bending.

The present inventors have found that a powder coating composition comprising a specific powder which contains specific amounts of a specific vinylidenefluoride copolymer and a specific methyl methacrylate copolymer can provide a coating film being excellent particularly in bending resistance.

Namely, an object of the present invention is to provide a powder coating composition which is superior in dispersibility of pigment, weather resistance, appearance and stainproofing property and particularly excellent in bending resistance, which makes it possible to give a coating film being hardly cracked during bending process of the metal plate with the film thereon in the application for PCM.

DISCLOSURE OF THE INVENTION

The present invention relates to a powder coating composition comprising a powder which contains 100 parts by weight of a vinylidene fluoride copolymer having a melting point of not higher than 150° C., a crystallinity of not higher than 35% and a weight average molecular weight of from $1 \times 10^4$ to $5 \times 10^5$ and 10 to 400 parts by weight of a methyl methacrylate copolymer having a glass transition temperature of not higher than 110° C. and a weight average molecular weight of from $1 \times 10^4$ to $5 \times 10^5$;

an average particle size of particles constituting the powder being from 1 to 100 μm and an apparent density of the powder being from 0.2 to 1 g/ml.

BEST MODE FOR CARRYING OUT THE INVENTION

As the specific vinylidene fluoride (VdF) copolymer which can be employed in the present invention, there is, for example, a copolymer obtained by copolymerizing VdF as an essential component with one or more monomers copolymerizable with VdF, for example, a fluoroolefine monomer such as tetrafluoroethylene (TFE), trifluoroethylene (TrFE), chlorotrifluoroethylene (CTFE) or hexafluoropropylene (HFP) or a monomer having an unsaturated bond such as perfluorobutenoic acid, maleic acid or vinyl acetate. By using such a copolymer, there are superior effects, which cannot be obtained by VdF homopolymer, that a coating film can be obtained at a relatively low temperature of not higher than 200° C. and occurrence of crack at the time of post processing of a coated metal plate can be prevented.

Among the VdF copolymers, from the viewpoints of good copolymerizability, weather resistance and thermal stability, VdF-TFE copolymer, VdF-TFE-HFP copolymer, VdF-TFE-CTFE copolymer, VdF-TFE-TrFE copolymer, VdF-CTFE copolymer, VdF-HFP copolymer, VdF-TFE-perfluorobutenoic acid copolymer and VdF-TFE-maleic acid copolymer are preferable, and VdF-TFE-HFP copolymer and VdF-TFE-CTFE copolymer are further preferable. Particularly by using a copolymer containing CTFE, balance between hardness of a coating film and post-processability can be improved.

A copolymerization ratio of VdF in the VdF copolymer is, from the viewpoint of good compatibility with methyl methacrylate copolymer, not less than 60% by mole, preferably not less than 70% by mole. From the viewpoint of post processability, the upper limit is preferably 98% by mole.

A melting point of the VdF copolymer is not higher than 150° C., preferably 40° to 120° C. from the viewpoints that leveling property is good and superior appearance, gloss and workability in coating can be obtained even if the powder coating composition obtained from the copolymer is not heated to a high temperature.

A crystallinity of the VdF copolymer is, due to the same reason mentioned above with respect to the melting point, not higher than 35%, preferably from 0 to 10%.

A weight average molecular weight of the VdF copolymer is not less than $1 \times 10^4$, from the viewpoints that in application such as PCM, crack hardly occurs during bending and post processability is not lowered, and is preferably not more than $5 \times 10^5$ from the viewpoints that flowability of the powder coating composition is not easy to be lowered and appearance of the coating film is not easy to be damaged.

As the specific methyl methacrylate copolymer which can be employed in the present invention, there are, for example, homopolymer of methyl methacrylate (MMA), a copolymer obtained by copolymerizing MMA as the main component with one or more monomers copolymerizable with MMA such as acrylic acid ester monomer and methacrylic acid ester monomer, and the like.

As the acrylic acid ester monomer, there are, for example, methyl acrylate, ethyl acrylate, propyl acrylate, n-butyl acrylate, isobutyl acrylate, t-butyl acrylate, n-hexyl acrylate, cyclohexyl acrylate, benzyl acrylate, lauryl acrylate, 2-ethylhexyl acrylate and the like.

As the methacrylic acid ester monomer, there are, for example, methyl methacrylate, ethyl methacrylate, propyl methacrylate, n-butyl methacrylate, isobutyl methacrylate, t-butyl methacrylate (t-BMA), n-hexyl methacrylate, cyclohexyl methacrylate, benzyl methacrylate, lauryl methacrylate, 2-ethylhexyl methacrylate and the like.

As the monomer copolymerizable with the above-mentioned MMA, there are, for example, further to the above-mentioned monomers, conjugated diene compounds such as 1,3-butadiene, isoprene and chloroprene; aromatic vinyl compounds such as styrene, α-methylstyrene, halogenated styrene and divinylbenzene; vinyl cyanide compounds such as acrylonitrile and methacrylonitrile; and the like.

By using such a copolymer, good effects can be obtained in appearance, thermal stability and weather resistance of the coating film.

In the present invention, the purposes are accomplished even if crosslinking is not carried out and, however, the powder coating composition of the present invention can be used in the form of a crosslinkable type by addition of a crosslinkable group and a curing agent in an amount where post processability which is characteristic of the present invention is not damaged.

Further in the present invention, as the monomer copolymerizable with MMA, further to the above-mentioned monomers, for example, a monomer containing one or more reactive groups such as

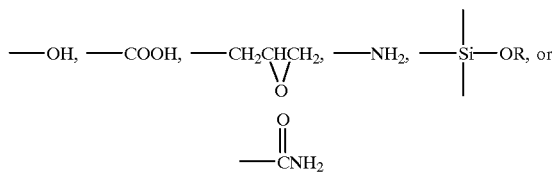

can be used.

As the above R, there are, for example, a saturated hydrocarbon residue having 1 to 3 carbon atoms and the like.

Among the above-mentioned reactive groups, —OH, —COOH and

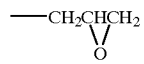

are preferable.

A MMA copolymer obtained by copolymerizing a monomer having such a reactive group can be used as thermosetting powder coating composition, for example, when used in combination with a curing agent.

As the monomer having such a reactive group, there are, for example, unsaturated carboxylic acids such as acrylic acid, methacrylic acid, maleic acid and crotonic acid; amide compounds such as acrylamide, methacrylamide N-methyl acrylamide, N-methyl methacrylamide, N-methylol acrylamide, N-methylol methacrylamide, N-alkyl acrylamide, N-alkyl methacrylamide, N,N-dialkyl acrylamide and N,N-dialkyl methacrylamide; acrylic acid esters such as 2-hydroxyethyl acrylate, N,N-dialkylaminoethyl acrylate and glycidyl acrylate; methacrylic acid esters such as 2-hydroxyethyl methacrylate, N,N-dialkylaminoethyl methacrylate, glycidyl methacrylate (GMA) and ethylene glycol dimethacrylate; vinyl ether compounds such as allylglycidyl ether; hydroxyl-containing monomers such as hydroxyethyl acrylate, hydroxyethyl methacrylate, hydroxypropyl acrylate and hydroxypropyl methacrylate; silicon-containing monomers such as γ-trimethoxysilane methacrylate and γ-triethoxysilane methacrylate.

The copolymerization ratio of MMA in the MMA copolymer is not less than 70% by mole, preferably 90 to 100% by mole from the viewpoints that compatibility with the VdF copolymer is good and that gloss of the coating film to be obtained is not easy to decrease.

The copolymerization ratio of the monomer in case where the monomer having the reactive group is copolymerized in the MMA copolymer is not more than 20% by mole, preferably 0.1 to 10% by mole from the viewpoint that post processability is good.

The glass transition temperature of the MMA copolymer is not higher than 110° C., preferably from 80° to 110° C. from the viewpoint that workability in coating process is good.

The weight average molecular weight of the MMA copolymer is preferably from $1 \times 10^4$ to $5 \times 10^5$ from the viewpoints that post processability is not easy to be worse and that appearance of the coating film is not easy to be damaged.

The above-mentioned VdF copolymer and MMA copolymer can be obtained by a conventional method.

In case of emulsion polymerization or suspension polymerization, there is, for example, a method which comprises removing a polymerization solvent after the polymerization is carried out, washing, drying and pulverizing.

And there is a method comprising drying and granulating with a spray dry after the polymerization.

In case of the emulsion polymerization, there is a method comprising adding an organic solvent to an obtained aqueous dispersion, agitating for granulation and, then, drying the granulated particles.

In case of solution polymerization, there is a method comprising pulverizing after evaporating an obtained solution to dryness or dispersing the obtained solution into a poor solvent of the copolymer, collecting the precipitated copolymer, drying and pulverizing.

Also, in case of bulk polymerization, there is a method comprising pulverizing an obtained bulk copolymer.

The specific powder of the present invention can be obtained by a conventional method, for example, a dry-blend method, from the VdF copolymer and the MMA copolymer prepared through the above-mentioned method.

As other method for obtaining the powder, there is, for example, a method comprising mixing an aqueous dispersion of VdF copolymer with an aqueous dispersion of MMA copolymer, both being obtained by the above-mentioned emulsion polymerization or suspension polymerization, co-coagulating and drying to give a desired powder or, further, pulverizing the dried resin.

As the mixing ratio of the VdF copolymer and the MMA copolymer, to 100 parts (parts by weight, hereinafter the same) of VdF copolymer, 10 to 400 parts, preferably 20 to 250 parts of MMA copolymer is admixed.

By adopting such a mixing ratio, adhesion of the powder coating composition to a substrate, bending resistance, gloss, weather resistance, water-proofing property and chemical resistance of the coating film obtained from the composition are hardly injured.

Further, as other method for obtaining the powder, there is, for example, a method wherein a monomer mixture comprising MMA and a monomer copolymerizable with MMA is seed-polymerized in an aqueous dispersion containing particles (hereinafter may be referred to as "seed particles") of VdF copolymer and an aqueous dispersion obtained by the seed polymerization is subjected to, for example, spray-drying or coagulation, drying and, if necessary, pulverizing to give the powder.

The VdF copolymer used as the seed particle can be obtained by a conventional emulsion polymerization as mentioned above. The powder can be obtained by emulsion-polymerizing, in an aqueous dispersion containing the seed particles, a monomer mixture comprising VdF and a monomer copolymerizable with VdF in the coexistence of not more than 1.0% by weight, preferably not more than 0.5% by weight, more preferably not more than 0.2% by weight (the lower limit is usually 0.01% by weight) of a fluorine-containing surfactant on the basis of water and 0.001 to 0.1% by weight, preferably 0.01 to 0.05% by weight of a non-fluorine-containing nonionic surfactant on the basis of water. This dispersion can contain the seed particles having the above-mentioned average particle size in a high concentration of 30 to 50% by weight. An amount of the fluorine-containing surfactant of more than 1.0% by weight is not preferable since there occurs phenomenon such as precipitation of the surfactant on a coating film when the coating film is made from the dispersion, and water absorption of the coating film tends to be increased and water proofing property tends to lower. An amount of the non-fluorine-containing nonionic surfactant of more than 0.1% by weight is not practical since, polymerization rate is lowered through chain transfer and reaction is stopped. In case of less than 0.001% by weight, there is almost no effect of reducing an average particle size of particles after polymerization. The polymerization temperature is 20° to 120° C., preferably 30° to 70° C. When the polymerization temperature is lower than 20° C., stability of the produced latex is generally lowered and when the polymerization temperature is higher than 120° C., decrease in polymerization rate through chain transfer tends to occur. The polymerization is, depending on the kind of polymer, usually carried out by heating under a pressure of 1.0 to 50 kgf/cm² (gauge pressure) for 5 to 100 hours.

As the monomer copolymerizable with VdF used here, there are the above-mentioned monomers and the same copolymerization ratio can be employed.

As the fluorine-containing surfactant used for emulsion polymerization of the seed particles, there is one or a mixture of compounds containing fluorine atom in its structure and having surface activity. There are, for example, acid represented by $X(CF_2)_nCOOH$ (n is an integer of 6 to 20, X is F or H) and an alkali metal salt, ammonium salt, amine salt or quaternary ammonium salt thereof; acid represented by $Y(CH_2CF_2)_mCOOH$ (m is an integer of 6 to 13, Y is F or Cl) and an alkali metal salt, ammonium salt, amine salt or quaternary ammonium salt thereof. More in concrete, there are ammonium salt of perfluorooctanoic acid, ammonium salt of perfluorononanoic acid and the like. Further, conventional fluorine-containing surfactants can be also used.

As the non-fluorine-containing nonionic surfactant used for emulsion polymerization of the seed particles, there are, for example, polyoxyethylene alkyl ethers, polyoxyethylene alkylphenyl ethers, polyoxyethylene alkyl esters, sorbitan alkyl esters, polyoxyethylene sorbitan alkyl esters, glycerol esters and derivatives thereof. More in concrete, examples of the polyoxyethylene alkyl ethers are, for instance, polyoxyethylene lauryl ether, polyoxyethylene cetyl ether, polyoxyethylene stearyl ether, polyoxyethylene oleyl ether, polyoxyethylene behenyl ether and the like. Examples of the polyoxyethylene alkyl phenyl ethers are for instance, polyoxyethylene nonyl phenyl ether, polyoxyethylene octyl phenyl ether and the like. Examples of the polyoxyethylene alkyl esters are, for instance, polyethylene glycol monolaurate, polyethylene glycol monooleate, polyethylene glycol monostearate and the like. Examples of the sorbitan alkyl esters are, for instance, polyoxyethylene sorbitan monolaurate, polyoxyethylene sorbitan monopalmitate, polyoxyethylene sorbitan monostearate, polyoxyethylene sorbitan monooleate and the like. Examples of the polyoxyethylene sorbitan alkyl esters are, for instance, polyoxyethylene sorbitan monolaurate, polyoxyethylene sorbitan monopalmitate, polyoxyethylene sorbitan monostearate and the like. Examples of the glycerol ethers are, for instance, glyceryl monomyristate, glyceryl monostearate, glyceryl monooleate and the like. Examples of the derivatives of the above-mentioned compounds are, for instance, a polyoxyethylene alkyl amine, a polyoxyethylene alkyl phenyl-formaldehyde condensate, a polyoxyethylene alkyl ether phosphate and the like. Particularly preferable are polyoxyethylene alkyl ethers and polyoxyethylene alkyl esters which have HLB value of 10 to 18. Examples thereof are polyoxyethylene lauryl ether (EO: 5 to 20, EO represents the number of ethylene oxide units), polyethylene glycol monostearate (EO: 10 to 55) and polyethylene glycol monooleate (EO: 6 to 10).

In the presence of the so-obtained seed particles, a monomer mixture containing MMA and a monomer copolymerizable with MMA is seed-polymerized.

As the monomer copolymerizable with MMA used here, there are, for example, the above-mentioned monomers.

The amount of MMA on the basis of the mixture of MMA and the copolymerizable monomer is not less than 70% by mole, preferably 90 to 100% by mole. By using MMA within the range, compatibility with the seed particles is better and gloss of the obtained coating film is not easy to be lowered.

The total amount of MMA and the monomer copolymerization with MMA is 10 to 400 parts, preferably 20 to 250 parts per 100 parts of the seed particles. By using MMA and the monomer within the range, adhesive property of the powder coating composition to substrate and bending resistance, gloss, weather resistance, water proofing property and chemical resistance of the coating film obtained from the composition are not easy to be lowered.

The seed polymerization can be carried out under the same conditions as in a conventional emulsion polymerization. For example, into an aqueous dispersion containing the seed particles are added a surfactant, polymerization initiator, chain transfer agent, and if necessary, chelating agent, pH modifier and solvent, and reaction is carried out at 20° to 90° C., preferably 20° to 80° C., more preferably 30° to 70° C. for 0.5 to 6 hours.

In the seed polymerization, each of a method wherein a whole amount of monomers are introduced at once into a reaction system, a method wherein a certain portion of monomers is introduced and reacted and then the remain is introduced continuously or dividedly, and a method wherein a whole amount of monomers is introduced continuously can be employed.

It is assumed that when a mixture of MMA and the monomer copolymerizable with MMA is seed-polymerized in the presence of the seed particles through emulsion polymerization method, the swelling of the seed particle with these monomers occurs, which results in an aqueous dispersion in which the seed particle is dissolved homogeneously in these monomers, and then these monomers are polymerized by the addition of an polymerization initiator to form a particle wherein molecular chains of MMA copolymer and molecular chains of VdF copolymer are compatibly entangled with each other. It is also assumed that pseudo-interpenetrating polymer network (S-IPM) is formed by copolymerizing a multifunctional monomer. As the multifunctional monomer, there are, for example, monoglycol dimethacrylate and diglycol dimethacrylate. With these monomers, a powder coating composition having better performances can be obtained.

As the surfactant in the present invention, an anionic surfactant, a nonionic surfactant, or a mixture thereof can be used and an amphoteric surfactant can also be used. As the anionic surfactant, a sulfate of higher alkyl alcohol such as sodium salt of an alkyl sulfonate, an alkylbenzene sulfonate, a dialkyl succinic acid ester sulfonate, an alkyldiphenyl ether disulfonate or the like can be used. As the nonionic surfactant, the above-mentioned non-fluorine-containing nonionic surfactant can also be used. As the amphoteric surfactant, lauryl betaine or the like can be used. Also, there can be used so-called reactive emulsifier, which is copolymerizable with MMA and the monomer copolymerizable with MMA, such as sodium styrene sulfonate or sodium alkylsulfosuccinate. An amount of the surfactant or reactive emulsifier is usually about 0.05 to 5.0 parts per 100 parts of the total of MMA and the monomer copolymerizable with MMA.

The polymerization initiator is not particularly limited if it generates radicals at 20° to 90° C. which can be subjected to free radical reaction in aqueous medium. As the case may be, it is possible to use the initiator in combination with a reducing agent. Usually, examples of the water-soluble polymerization initiator are a persulfate and hydrogen peroxide and examples of the reducing agent are sodium pyrobisulfite, sodium hydrogensulfite and sodium L-ascorbate. Examples of the oil-soluble polymerization initiator are, for instance, diisopropyl peroxydicarbonate (IPP), benzoyl peroxide, dibutyl peroxide and azobisisobutyronitrile (AIBN). An amount of the polymerization initiator is usually about 0.05 to 2.0 parts per 100 parts of the total of MMA and the monomer copolymerizable with MMA.

A polymerization temperature is 20° to 90° C., preferably 30° to 70° C.

As the chain transfer agent, a halogenated hydrocarbon (for example, chloroform, carbon tetrachloride), a mercaptan (for example, n-dodecylmercaptan, t-dodecylmercaptan, n-octylmercaptan or the like can be used. An amount of the chain transfer agent is usually about 0 to 5.0 parts per 100 parts of the total of MMA and the monomer copolymerizable with MMA.

As the solvent, methyl ethyl ketone, acetone, trichlorotrifluoroethane, methyl isobutyl ketone, ethyl acetate or the like can be used in such a small amount that workability, safety for accident, safety for environment and safety in production process becomes not worse. By the addition of the solvent, swelling property of the seed particle by the monomer may be improved.

As described above, the particle constituting the powder can be obtained by, for example, the dry blend method, the method of mixing two kinds of aqueous dispersions and coagulating, the method of seed polymerization, the method of spray-drying the aqueous dispersion of the seed polymer or, coagulating and drying. An average particle size of the particle is 1 to 100 μm, further 1 to 10 μm. When the average particle size is less than 1 μm, it is difficult to control thickness of the coating film due to electrostatic repulsion, and foaming easily occurs to cause the lowering of appearance. When more than 100 μm, leveling property and appearance of the coating film are lowered.

The powder has an apparent density of 0.2 to 1 g/ml. When the apparent density is within the range, appearance of the coating film and coating workability are good. If the apparent density is less than 0.2 g/ml, leveling property becomes worse to make the coating film uneven. Also, if more than 1 g/ml, adhesion of the coating powder becomes so worse that workability of thick coating is lowered and it becomes difficult to handle the powder.

Since the powder has a softening temperature of not less than 40° C., each particle does not stick to each other when stored at ordinary temperature and stability of the powder is good. It should be noted that, in the present specification, the softening temperature means a glass transition point or melting point of not lower than 40° C. which the obtained resin composition has.

In the present invention, the MMA copolymer obtained by copolymerizing the monomer having a reactive group as mentioned above can be used in combination with a curing agent.

As the curing agent, for example, block isocyanate such as ε-caprolactam isocyanate, isophoronediisocyanate, tolylenediisocyanate, xylylenediisocyanate, 4,4-diphenylmethanediisocyanate or hexamethylenediisocyanate is preferable and a curing agent which is in solid state at ordinary temperature is particularly preferable. An amount of the curing agent is preferably from 0.1 to 5 parts per 100 parts of the MMA copolymer or the monomer having a reactive group.

As the powder coating composition, the powder comprising the VdF copolymer and the MMA copolymer may be used as it is, or the powder can be used after mixing with the curing agent and additives which are employed for usual powder coating compositions.

As the additives for powder coating, there are, for example, pigment, surface modifier, organic solvent, plasticizer and the like.

The powder coating composition of the present invention can be applied to various kinds of substrates. The coating method is, for example, a usual electrostatic coating method wherein the composition is applied by airless spray on a metal plate to which specific voltage is applied, and then sintered.

Examples of the substrate or article are, for instance, exterior goods for architecture such as panel for external wall, sash, roof material and fence, exterior goods for civil construction such as chemical plant, pipe, erection frame, guard rail and steel tower, exterior goods of car, ship, switchboard, outdoor machine of air conditioner and electric appliance, and exterior goods for antenna and agricultural machinery.

As the powder coating composition of the present invention, the following combination is preferable.

| (A) | VdF copolymer | 100 parts |
| --- | --- | --- |
|  | Melting point | not higher than 150° C. |
|  | Crystallinity | not more than 35% |
|  | Weight average molecular weight | $1 \times 10^4$ to $5 \times 10^5$ |
| (B) | MMA copolymer | 10 to 400 parts |
|  | Glass transition temperature | not higher than 110° C. |
|  | Weight average molecular weight | $1 \times 10^4$ to $5 \times 10^5$ |
| Powder comprising (A) and (B) | | |
|  | Average particle size of particles | 1 to 100 μm |
|  | Apparent density of powder | 0.2 to 1 g/ml |

This composition is advantageous from the viewpoint that the coating film superior in post processing and stainproofing property can be formed by heating to not higher than 200° C.

Further preferable combination is as follows.

| (A) | VdF-TFE copolymer | 100 parts |
| --- | --- | --- |
|  | Melting point | 60° to 150° C. |
|  | Crystallinity | 1 to 25% |
|  | Weight average molecular weight | $1 \times 10^4$ to $5 \times 10^5$ |
| (B) | MMA copolymer | 10 to 400 parts |
|  | Glass transition temperature | 110° C. |
|  | Weight average molecular weight | $1 \times 10^4$ to $5 \times 10^5$ |
| Powder comprising (A) and (B) | | |
|  | Average particle size of particles | 1 to 100 μm |
|  | Apparent density of powder | 0.2 to 1 g/ml |

This composition is superior in appearance of the coating film in addition to the above-mentioned characteristics.

EXAMPLE

Hereinafter the present invention is explained more in detail on the basis of examples, but is not limited thereto.

Preparation Example 1

A one liter pressure-resistant reactor equipped with a stirrer was charged with 500 ml of deionized water, 1.25 g of ammonium perfluorooctanoate and 0.025 g of polyoxyethylene alkyl ester emulsifier MYS 40 (available from Nikko Chemical Co., Ltd.), and feeding of pressurized nitrogen gas and degassing were repeated. After removing dissolved oxygen, the reactor was pressurized to 10 kg/cm$^2$ at 60° C. with a monomer admixture of VdF/TFE/CTFE having a mole ratio of 74/14/12. Then, after charging with 1.5 g of ethyl acetate (EtOAc) and 0.2 g of ammonium persulfate, the reaction was continued for 58 hours by supplying the monomer mixture successively so that the pressure inside the reactor was kept at 10 kg/cm$^2$ constantly, and then the temperature and pressure inside of the reactor were then turned to ordinary temperature and pressure to terminate the reaction. The solid content of the obtained aqueous dispersion was 37%. The obtained aqueous dispersion was precipitated by freezing at −25° C., dewatered and washed and, then, vacuum-dried at 80° C. to obtain a VdF copolymer (white powder). The solid content of the aqueous dispersion and the melting point, crystallinity, weight average molecular weight (Mw) of the VdF copolymer were measured by the following methods.

Solid Content

The aqueous dispersion was dried for one hour at 150° C. in a vacuum dryer. A ratio of a weight after the drying to a weight of the aqueous dispersion before the drying is represented by percentage.

Melting Point and Crystallinity

By means of Thermal Analysis System (manufactured by Perkin-Elmer Corporation), thermal balance of 10 mg of VdF copolymer was measured in a temperature range from −25° to 200° C. at a temperature raising rate of 10° C./minute and a top of peak was assumed to be its melting point. Also, crystallinity was calculated from a ratio of area of heat absorption peak of the melting point to area of heat absorption peak of the perfectly crystallized VdF copolymer (theoretical value: 22.3 J/mol).

Mw

From a THF solution containing 0.5% by weight of VdF copolymer, a molecular weight converted to styrene was calculated by controlling a flow rate of the carrier (THF) to 1.0 ml/minute by means of Column TSK gel G4000XL (available from TOSOH CORPORATION).

The results are shown in Table 1.

Preparation Examples 2 to 10

Polymerization was carried out in the same manner as in Preparation Example 1 except that monomer components and an amount of ethyl acetate were changed as shown in Table 1, and the same measurements as in Preparation Example 1 were conducted with respect to the obtained aqueous dispersion and VdF copolymer. The results are shown in Table 1.

TABLE 1

| Preparation Examples of VdF copolymer | | 1 | 2 | 3 | 4 | 5 | 6 | 7 | 8 | 9 | 10 |
|---|---|---|---|---|---|---|---|---|---|---|---|
| Monomer components | VdF | 74 | 74 | 74 | 74 | 74 | 55 | 100 | 80 | 78 | 60 |
| (% by mole) | TFE | 14 | 14 | 14 | 14 | 14 | 45 | — | 20 | 16 | 20 |
| | CTFE | 12 | 12 | 12 | 12 | 12 | 12 | — | — | — | — |
| | HFP | — | — | — | — | — | — | — | — | 6 | 20 |
| EtOAc (g) | | 1.5 | 0.5 | 5.0 | 0 | 5.5 | 1.5 | 1.5 | 1.5 | 0.5 | 4.0 |
| Polymerization time (Hr) | | 58 | 30 | 68 | 23 | 73 | 16 | 42 | 24 | 56.5 | 52.0 |
| Solid content (%) | | 37 | 38 | 20 | 39 | 21 | 18 | 20 | 19 | 38 | 30 |
| Melting point (° C.) | | 91 | 92 | 91 | 90 | 89 | 168 | 162 | 120 | 2 | 0 |
| Crystallinity (%) | | 3 | 3 | 2 | 3 | 3 | 55 | 40 | 30 | 86 | — |
| Mw (×10$^4$) | | 24 | 42 | 1.4 | 61 | 0.9 | 21 | 13 | 22 | 48.1 | 2.6 |

Examples 1 to 4 and Comparative Examples 1 to 4

A one liter four neck flask with a stirring blade, cooling tube and thermometer was charged with 200 ml of deionized water, 2 g of a reactive emulsifier JS2 (available from SANYO CHEMICAL INDUSTRIES, LTD.) of a succinate derivative and 2 g of polyoxyethylene nonyl phenyl ether (EO 10). When reaching 80° C. in a hot water bath under stream of nitrogen gas, 10 ml of a solution containing 2% by weight of ammonium persulfate was added and, then, a mixture of 190 g of methyl methacrylate, 10 g of t-butyl methacrylate and 0.2 g of n-lauryl mercaptan as a chain transfer agent was added dropwise over one hour. Immediately after the addition, 1 ml of a solution containing 2% by weight of ammonium persulfate was added to begin the reaction. After three hours from the beginning of the reaction, the temperature of the bath was raised to and kept at 85° C. for one hour and then, filtrated with a wire net of 300 meshes to give a bluish-white aqueous dispersion. The obtained aqueous dispersion was precipitated by freezing at −25° C., dewatered and washed, and then, vacuum-dried at 80° C. to obtain a MMA copolymer (white powder).

The glass transition temperature and Mw of the obtained MMA copolymer were measured by the following methods.

Glass Transition Temperature

By means of Thermal Analysis System (manufactured by Perkin-Elmer Corporation), thermal balance of 10 mg of VdF copolymer was measured in a temperature range from −25° to 200° C. at a temperature raising rate of 10° C./minute. Glass transition temperature was calculated from the point of inflection in an obtained chart by using the middle point method.

Mw

From a THF solution containing 0.5% by weight of MMA copolymer, molecular weight converted to styrene was calculated by controlling a flow rate of the carrier (THF) to 1.0 ml/minute by means of Column TSK gel G4000XL (available from TOSOH CORPORATION).

The results are shown in Table 2.

To 43 parts by weight of the powder, 100 parts by weight of any one of the VdF copolymer powders obtained in Preparation Examples 1 to 8 were dry-blended by means of Micro Hammer Mill (manufactured by IKA) to obtain a powder coating composition. This powder coating composition was electrostatically deposited on a steel plate of 0.3 mm thickness, by applying 40 kV of voltage to the plate, spraying with an airless spray gun so that the desired average thickness of coating film was 60 μm, and then sintering at 180° C. for 20 minutes. An average particle size and an apparent density of particles of the powder coating composition, and for evaluation of the obtained coating film, a coating thickness, smoothness and transparency as appearance of the coating film, bending resistance, stain-proofing property and weather resistance were measured by the following methods.

Average Particle Size

Average size was measured by means of a laser beam scattering particle size meter (ELS-3000 manufactured by Otsuka Denshi Kabushiki Kaisha).

Apparent Density

Apparent density was measured according to JIS K 6891-5.3.

Thickness of a Coating Film

Thickness of the obtained coating film was measured by means of an eddy-current instrument for measuring thickness EL10D (Sanko Denshi Kenkyusho).

Smoothness

Surface of the obtained coating film was observed with naked eyes and evaluated as ○ when no uneveness, pinhole and foam were observed, Δ when there was no obstacle for practical use, and X as to the other cases.

Transparency

By observing turbidity of the obtained coating film with naked eyes, the coating film was evaluated as ○ when transparent, Δ when slightly turbid and X when turbid in white.

Bending Resistance

Bending test at an angle of 180 degrees was carried out according to JIS K 5400.

Stain-Proofing Property

Oily marking ink (red) was coated all over a surface of a coating plate and after allowing to stand for 24 hours at room temperature, the coated surface was wiped off with a cloth soaked with ethanol. An area on which the red ink remained was represented as ΔE and stain-proofing property was evaluated as ○ in case of ΔE<5, Δ in case of 5≦ΔE<10 and X in case of 10≦ΔE.

Weather Resistance

Gloss retention ratio after having been allowed to stand for 1,000 hours in an accelerated weather resistance testing machine (SUV) was measured. Gloss retention ratio was evaluated as ○ when not less than 80%; as Δ when 60 to 80%; and as X when not more than 60%.

The results are shown in Table 2.

Comparative Example 5

The powder coating composition obtained in Example 1 was heat-treated at 150° C. for 24 hours and cooled. Then, the resulting partially fused composition was pulverized with Micro Hammer Mill to obtain a powder coating composition. Measurement of average particle size and apparent density of the particles constituting this composition and evaluations of the obtained coating film were carried out in the same manner as in Example 1. The results are shown in Table 2.

Comparative Example 6

The aqueous dispersion obtained in Preparation Example 1 and the aqueous dispersion obtained in Example 1 were blended so that a ratio of solid contents was the same as that in Example 1. After vacuum-drying at 50° C., the solid was pulverized with Micro Hammer Mill to give a powder coating composition. Measurement of average particle size and apparent density of the particles constituting this composition and evaluations of the obtained coating film were carried out in the same manner as in Example 1. The results are shown in Table 2.

TABLE 2

|  | Example No. | | | | Comparative Example No. | | | | | |
| --- | --- | --- | --- | --- | --- | --- | --- | --- | --- | --- |
|  | 1 | 2 | 3 | 4 | 1 | 2 | 3 | 4 | 5 | 6 |
| Preparation Example No. of VdF copolymer used | 1 | 2 | 3 | 8 | 4 | 5 | 6 | 7 | 1 | 1 |
| Glass transition temperature of MMA copolymer (° C.) | 95 | 95 | 95 | 95 | 95 | 95 | 95 | 95 | — | — |
| Mw of MMA copolymer (×10$^4$) | 21 | 21 | 21 | 21 | 21 | 21 | 21 | 21 | — | — |
| Average particle size of particles constituting powder (μm) | 68 | 70 | 70 | 59 | 68 | 73 | 43 | 46 | 65 | 10 |
| Apparent density of powder (g/ml) | 0.37 | 0.38 | 0.36 | 0.36 | 0.38 | 0.38 | 0.27 | 0.29 | 0.18 | 1.03 |
| Thickness of coating film (μm) | 62 | 65 | 59 | 65 | 64 | 61 | No film formed | No film formed | 63 | 48 |
| Appearance of coating film (smoothness) | ○ | ○ | ○ | ○ | Δ | ○ |  |  | Δ | ○ |
| Appearance of coating film (transparency) | ○ | ○ | ○ | ○ | Δ | ○ |  |  | X (Foaming) | ○ |
| Bending resistance (mm) | 2 | 2 | 4 | 3 | 6 | 6 |  |  | — | 2 |
| Stain-proofing property | ○ | ○ | ○ | ○ | ○ | ○ |  |  | Δ | ○ |
| Weather resistance | ○ | ○ | ○ | ○ | ○ | ○ |  |  | ○ | ○ |

As apparent from the results shown in Table 2, it is recognized that when the molecular weight is low, appearance of the coating film is good, but bending resistance becomes worse (Comparative Example 2) and when the molecular weight is higher, smoothness and transparency of the coating film becomes worse (Comparative Example 1).

Also, it is recognized that when the melting point is too high or when crystallinity is too high, film forming ability becomes worse (Comparative Examples 3 and 4).

Also, it is recognized that when the apparent density is small, smoothness and appearance of the coating film becomes worse and when the apparent density is large, the thickness of the coating film is smaller than the pre-set coating thickness and workability is lowered (Comparative Examples 5 and 6).

In Examples 1 to 4, however, it is recognized that appearance of the coating film, bending resistance, stain-proofing property and weather resistance—are superior.

Example 5

A one-liter four neck flask equipped with a stirring blade, cooling tube and thermometer was charged with 500 g of the aqueous dispersion of VdF copolymer obtained in Preparation Example 1, and thereto, 0.5% by weight of the JS2 was added on the basis of the solid content of resin. By heating in a hot-water bath under stirring, when the temperature in the bath reached 80° C., an emulsion obtained by emulsifying 185 g of methyl methacrylate monomer and 0.1 g of n-lauryl mercaptan as a chain transfer agent with a solution containing 0.5% by weight of the JS2 was added dropwise for one hour. Immediately after the addition, 1 ml of a solution containing 2% by weight of ammonium persulfate was added to initiate the reaction (seed polymerization). After three hours from the beginning of the reaction, the temperature inside the bath was raised to 85° C. and kept for one hour, then cooled and filtrated with a metal net of 300 meshes to give a bluish while aqueous dispersion of a seed polymer. The obtained aqueous dispersion was fed into a sintering chamber of 70° C. through a nozzle having a diameter of 1.1 mm at a rate of 2 kg/H, dried (spray-dry) and then recovered to give a powder having the properties shown in Table 3. By employing this powder, the electrostatic coating was carried out in the same manner as in Example 1 and the obtained coating film was evaluated. The results are shown in Table 3.

Examples 6 to 12 and Comparative Examples 7 to 10

A powder having the properties shown in Table 3 was prepared in the same manner as in Example 5 except that the aqueous dispersion of VdF copolymer, the composition of acrylic monomers and the amount of n-lauryl mercaptan were changed as shown in Table 3, and then the electrostatic coating was carried out and the obtained coating film was evaluated. The results are shown in Table 3.

Comparative Example 11

A one-liter pressure resistant reactor was charged with 523 g of t-butanol, 53 g of cyclohexylvinyl ether, 30 g of isobutylvinyl ether, 83 g of hydroxybutylvinyl ether, 3.3 g of potassium carbonate and 0.23 g of AIBN, followed by solidifying and degassing with liquid nitrogen to remove dissolved oxygen. After 167 g of pressurized CTFE was fed into the reactor, the reactor temperature was raised to 65° C., and the reaction was continued for 10 hours. After cooling, the monomer residue was distilled off, the solution was recovered and the dispersing medium was distilled off at 60° C. under a reduced pressure. The resulting product was pulverized together with dry ice by using Micro Hammer Mill (IKA) and then classified by a sieve of 200 meshes to give a powder having an average particle size of 47 $\mu$m. To 100 parts by weight of this powder, 15 parts by weight of $\epsilon$-caprolactam block isocyanate was mixed by dry-blending to give a powder coating composition. The evaluations of the obtained coating film was carried out in the same manner as in Example 5. The results are shown in Table 3.

Comparative Examples 12 and 13

An aqueous dispersion was prepared in the same manner as in Example 5 except that the aqueous dispersion of VdF copolymer was not used and the acryl monomer shown in Table 3 was used. The dispersion was spray-dried in the same manner as above to give a powder coating composition and the evaluations of the obtained coating film were carried out in the same manner as in Example 5. The results are shown in Table 3.

Comparative Examples 14 and 15

The aqueous dispersion of seed polymer obtained in Example 5 was precipitated by freezing at −25° C. and, then, vacuum-dried at 80° C. to give particles. A portion of the particles was melted and solidified. By pulverizing the solid together with dry ice by means of Micro Hammer Mill and classifying with a standard sieve, a powder having an average particle size of 106 $\mu$m was obtained (which is referred to as Comparative Example 14). Also, the aqueous dispersion was precipitated by freezing in the same manner as above and then freeze-dried and classified with a 625 mesh sieve. Thus a powder having an average particle size of 0.9 $\mu$m was obtained (which is preferred to as Comparative Example 15). With respect to each powder, the evaluations of the obtained coating film were carried out in the same manner as in Example 5, provided that evaluations of bending resistance, stain-proofing property and weather resistance were not carried out. The results are shown in Table 3.

Example 13

To 100 parts by weight of the powder with the monomer components shown in Table 3, 5 parts by weight of $\epsilon$-caprolactam isocyanate was mixed by dry-blending to give a powder coating composition and the evaluations of an obtained coating film were carried out in the same manner as in Example 5. The results are shown in Table 3.

Example 14

The seed polymerization was carried out in the same manner as in Example 5 except that 160 parts by weight of Tipek CR 90 (available from ISHIHARA SANGYO KAISHA, LTD.) which was titanium oxide dispersed in water was added together with the acrylic monomer. The obtained aqueous dispersion was dried to give a powder in the same manner as in Example 5 and the evaluations of the obtained coating film were carried out in the same manner as in Example 5. It should be noted that transparency was evaluated with naked eyes (in the same manner as in Example 1) and with respect to gloss, reflectance at 60° was measured with a gloss meter (available from Suga Shikenki). The results are shown in Table 3.

TABLE 3

|  |  | Example No. | | | | | | | | | |
|---|---|---|---|---|---|---|---|---|---|---|---|
|  |  | 5 | 6 | 7 | 8 | 9 | 10 | 11 | 12 | 13 | 14 |
| Preparation Example No. of VdF copolymer used | | 1 | 9 | 10 | 1 | 1 | 8 | 1 | 1 | 1 | 1 |
| Acrylic monomer per 100 parts by weight of VdF copolymer (parts by weight) | MMA | 100 | 100 | 100 | 100 | 100 | 11 | 360 | 90 | 80 | 100 |
| | BA | — | — | — | — | — | — | 40 | — | — | — |
| | GMA | — | — | — | — | — | — | — | — | 20 | — |
| | t-BMA | — | — | — | — | — | — | — | 10 | — | — |
| Titanium oxide (parts by weight) | | — | — | — | — | — | — | — | — | — | 160 |
| n-Lauryl mercaptan (% based on monomers) | | 0.1 | 0.1 | 0.1 | 0.01 | 3.0 | 0.1 | 0.1 | 0.1 | 0.1 | 0.1 |
| Softening temperature of powder (° C.) | | 70 | 72 | 70 | 76 | 67 | 107 | 80 | 69 | 67 | 73 |
| Mw of MMA copolymer ($\times 10^4$) | | 20 | 19 | 20 | 49 | 2.0 | 18 | 19 | 20 | 20 | 20 |
| Average particle size of particles Constituting powder ($\mu$m) | | 82 | 86 | 84 | 82 | 88 | 73 | 85 | 84 | 85 | 73 |
| Apparent density of powder (g/ml) | | 0.58 | 0.53 | 0.55 | 0.58 | 0.56 | 0.59 | 0.42 | 0.59 | 0.65 | 0.95 |
| Appearance of coating film | Smoothness | ○ | ○ | ○ | ○ | ○ | Δ | ○ | ○ | ○ | ○ |
| | Transparency | ○ | ○ | ○ | ○ | ○ | Δ | Δ | ○ | ○ | 78 (gloss) |
| Bending resistance (mm) | | 2 | 2 | 2 | 2 | 3 | 4 | 4 | 3 | 3 | 2 |
| Stain-proofing property | | ○ | ○ | ○ | ○ | ○ | ○ | ○ | ○ | ○ | ○ |
| Weather resistance | | ○ | ○ | ○ | ○ | ○ | ○ | Δ | ○ | ○ | ○ |
| Coating thickness ($\mu$m) | | 65 | 63 | 58 | 61 | 64 | 54 | 64 | 67 | 65 | 63 |

|  |  | Comparative Example No. | | | | | | | | |
|---|---|---|---|---|---|---|---|---|---|---|
|  |  | 7 | 8 | 9 | 10 | 11 | 12 | 13 | 14 | 15 |
| Preparation Example No. of VdF copolymer used | | 1 | 1 | 8 | 1 | — | — | — | 1 | 1 |
| Acrylic monomer per 100 parts by weight of VdF copolymer (parts by weight) | MMA | 42 | 42 | 9 | 350 | — | 90 | 70 | 100 | 100 |
| | BA | — | — | — | 70 | — | — | 30 | — | — |
| | GMA | — | — | — | — | — | — | — | — | — |
| | t-BMA | — | — | — | — | — | 10 | — | — | — |
| Titanium oxide (parts by weight) | | — | — | — | — | — | — | — | — | — |
| n-Lauryl mercaptan (% based on monomers) | | — | 6.0 | 0.1 | 0.1 | — | 0.1 | 0.1 | 0.1 | 0.1 |
| Softening temperature of powder (° C.) | | 59 | 45 | 120 | 73 | 47 | 102 | 54 | 70 | 70 |
| Mw of MMA copolymer ($\times 10^4$) | | Insoluble | 0.9 | 17 | 22 | — | 19 | 19 | 20 | 20 |
| Average particle size of particles constituting powder ($\mu$m) | | 76 | 83 | 71 | 87 | 47 | 85 | 82 | 106 | 0.9 |
| Apparent density of powder (g/ml) | | 0.56 | 0.57 | 0.61 | 0.40 | 0.25 | 0.43 | 0.41 | 0.24 | 0.69 |
| Appearance of coating film | Smoothness | No film formed | ○ | Δ | ○ | ○ | ○ | ○ | (Uneven) X | (Foaming) Δ |
| | Transparency | | ○ | Δ | X | ○ | ○ | ○ | Δ | X |
| Bending resistance (mm) | | | 6 | 6 | 4 | 6 | 10 | 2 | — | — |
| Stain-proofing property | | | ○ | ○ | Δ | Δ | X | X | — | — |
| Weather resistance | | | ○ | ○ | X | ○ | X | X | — | — |
| Coating thickness ($\mu$m) | | | 68 | 71 | 64 | 84 | 63 | 65 | (Uneven) | 27 |

In Table 3, when the powder coating composition is applied on an aluminum plate by 50 $\mu$m thick and the coated aluminum plate is heated in a vacuum dryer from 25° to 150° C. at a temperature raising rate of 1° C./min, the lowest temperature where re-dispersion of the powder does not occur is assumed to be a softening temperature.

Abbreviations in Table 3 represent the followings.
MMA: Methyl methacrylate
BA: n-Butyl acrylate
GMA: Glycidyl methacrylate
t-BMA: t-Butyl methacrylate As it is clear from the results in Table 3, when the molecular weight of MMA copolymer is not less than 500,000, there is no film forming ability (Comparative Example 7), and when the molecular weight of MMA copolymer is too low, bending resistance is lowered (Comparative Example 8). Also when a ratio of MMA copolymer to VdF copolymer is low, appearance of a coating film and bending resistance become worse (Comparative Example 9), and when the ratio is high, appearance and weather resistance are lowered (Comparative Example 10). In case of the CTFE resin, bending resistance and stain-proofing property become worse (Comparative Example 11). In case of the MMA copolymers, weather resistance and stain-proofing property become worse (Comparative Examples 12 and 13). Also when an average particle size of a powder becomes large, smoothness of a coating film is lost (Comparative Example 14), and when small, foaming is easy to occur (Comparative Example 15).

INDUSTRIAL APPLICABILITY

The powder coating composition of the present invention has good pigment dispersibility, and the obtained coating film is excellent in weather resistance, appearance, stain-proofing property, particularly bending resistance and can be used particularly suitably for PCM which requires post-processability.

What is claimed is:
1. A powder coating composition comprising a powder and a pigment, wherein said powder contains a vinylidene fluoride copolymer having a melting point of not higher than 150° C. and a weight average molecular weight of $1\times 10^4$ to

$5\times10^5$ and a methyl methacrylate copolymer having a glass transition temperature of not higher than 110° C. and a weight average molecular weight of $1\times10^4$ to $5\times10^5$; a number average particle size of particles constituting the powder being from 1 to 100 µm and an apparent density of the powder being from 0.2 to 1 g/ml, and wherein the vinylidene fluoride copolymer comprises an amount of vinylidene fluoride monomer of from 60 to 80 mol. %, and said powder is a powder obtained by emulsion-seed-polymerizing 10 to 400 parts by weight of a monomer mixture comprising methyl methacrylate and a monomer copolymerizable with methyl methacrylate in an aqueous dispersion containing 100 parts by weight of particles of the emulsion-polymerized vinylidene fluoride copolymer.

2. The powder coating composition of claim 1, wherein said vinylidene fluoride copolymer particles in the aqueous dispersion are particles of a copolymer of vinylidene fluoride, tetrafluoroethylene and at least one monomer selected from the group consisting of chlorotrifluoroethylene, trifluoroethylene and hexafluoropropylene.

3. The powder coating composition of claim 1, wherein the vinylidene fluoride copolymer particles are particles of a copolymer of vinylidene and tetrafluoroethylene.

4. The powder coating composition of claim 1, wherein the vinylidene fluoride copolymer particles are particles of a copolymer of vinylidene, tetrafluoroethylene and hexafluoropropylene.

5. A process for preparing a powder coating composition, comprising:

emulsion-seed-polymerizing 10 to 400 parts by weight of a monomer mixture comprising methyl methacrylate and a monomer copolymerizable with methyl methacrylate in an aqueous dispersion containing 100 parts by weight of particles of an emulsion-polymerized vinylidene fluoride copolymer containing vinylidene fluoride in an amount of 60 to 80% by mole to prepare a powder containing the vinylidene fluoride copolymer having a melting point of not higher than 150° C. and a weight average molecular weight of $1\times10^4$ to $5\times10^5$ and a methyl methacrylate copolymer having a glass transition temperature of not higher than 110° C. and a weight average molecular weight of $1\times10^4$ to $5\times10^5$, a number average particle size of particles constituting the powder being from 1 to 100 µm and an apparent density of the powder being from 0.2 to 1 g/ml; and blending the powder with a pigment.

6. The process of claim 5, wherein the vinylidene fluoride copolymer particles to be seed-polymerized are particles of a copolymer of vinylidene and tetrafluoroethylene.

7. The process of claim 5, wherein the vinylidene fluoride copolymer particles to be seed-polymerized are particles of a copolymer of vinylidene, tetrafluoroethylene and hexafluoropropylene.

* * * * *